No. 694,627. Patented Mar. 4, 1902.
P. F. GLACKIN.
AUTOMATIC FLUSHING TANK.
(Application filed Feb. 6, 1900.)

(No Model.)

WITNESSES:
S. H. Perham.
Lindley S. Anderson.

Peter F. Glackin
INVENTOR

BY Connolly Bros
ATTORNEYS

UNITED STATES PATENT OFFICE.

PETER F. GLACKIN, OF PITTSBURG, PENNSYLVANIA, ASSIGNOR TO STANDARD SANITARY MFG. CO., OF PITTSBURG, PENNSYLVANIA, A CORPORATION OF NEW JERSEY.

AUTOMATIC FLUSHING-TANK.

SPECIFICATION forming part of Letters Patent No. 694,627, dated March 4, 1902.

Application filed February 6, 1900. Serial No. 4,272. (No model.)

*To all whom it may concern:*

Be it known that I, PETER F. GLACKIN, a citizen of the United States, residing at Pittsburg, in the county of Allegheny and State of Pennsylvania, have invented certain new and useful Improvements in Automatic Flushing-Tanks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to flushing-tanks for water-closets, latrines, and the like, and has for its object the provision of novel means for producing an automatic periodical emptying of the tank into the closet or other receptacle with which it is connected, so as to flush the same at such predetermined intervals as may be necessary.

My invention has for its further object the provision of novel means for securing a refill of the closet or the like after the operation of the tank has flushed the same.

My invention consists in the novel construction, combination, and arrangement of parts hereinafter described and claimed.

Figure 1:
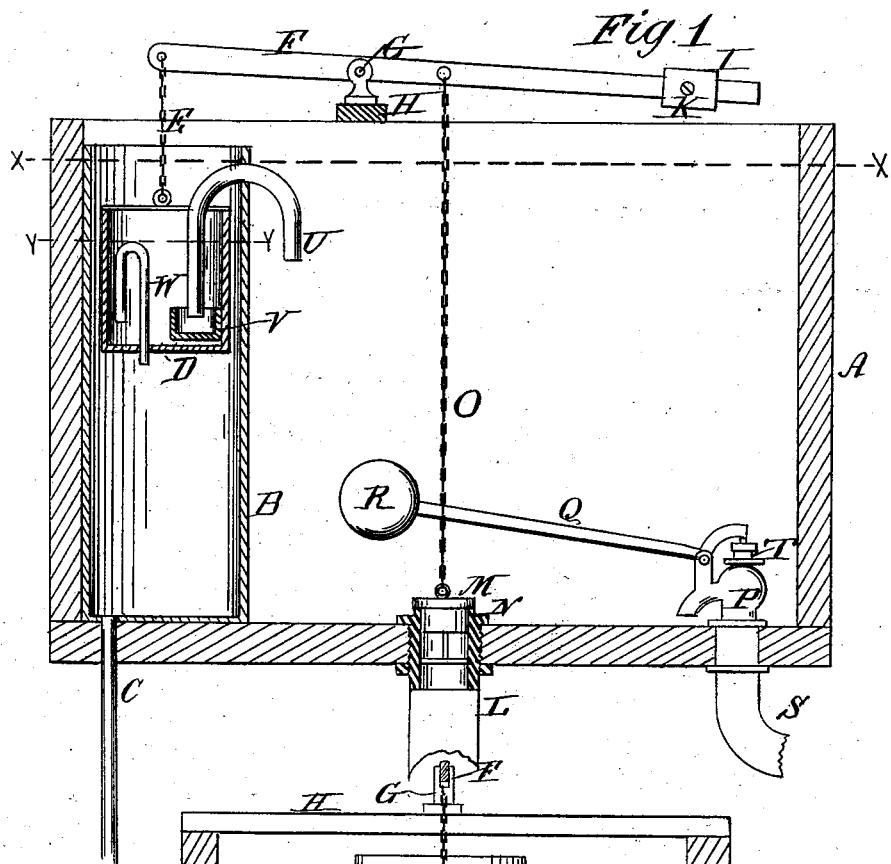
Figure 2:
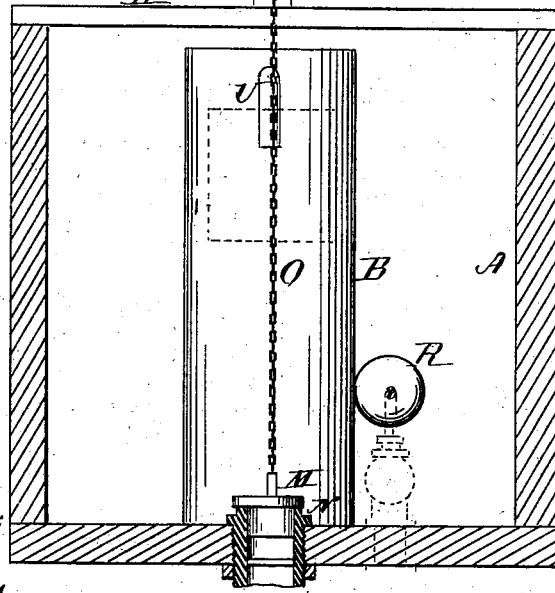

Referring to the accompanying drawings, wherein Figure 1 is a vertical sectional view of a flushing-tank embodying my invention, and Fig. 2 a transverse sectional view of the same.

A designates the body of the tank, which is of the ordinary form and of a size adapted to the requirements of the particular apparatus which is to be flushed.

Within the tank A and preferably arranged for convenience of operation near one end of the same is a supplementary tank B, that rests on the bottom of tank A and reaches nearly to the top thereof. A waste-pipe C leads from the bottom of tank B, through the bottom of tank A, and down to the receptacle which is flushed from the tank.

D designates a bucket, which is arranged within the supplementary tank B and is suspended by a chain E from a lever F, that is fulcrumed at G on a cross-bar H and is provided with an adjustable weight I, which is secured in position upon the lever F by a set-screw K.

L designates the flushing-pipe that leads from the tank A to the closet or other apparatus to be flushed, and M designates a valve, which rests on the seat N and which keeps the water in the tank from flowing into the flushing-pipe while it rests on its seat. A chain O connects the valve M with the lever F.

A ball-cock P, having an adjustable valve T, is arranged at any convenient point in the tank A, being shown on the bottom of the tank, so as to produce a noiseless flow of water into the tank, and S designates a pipe leading from a source of supply of water, such as a main. A ball or float R is arranged on the end of the lever-arm Q of the ball-cock, and as the ball rises and falls with the water in the tank the ball-cock is opened and closed.

A siphon-tube U passes through the wall of the supplementary tank B, the bend of the tube being near the top of said supplementary tank and the shorter leg of the tube in the tank A, while the longer leg depends in the supplementary tank B and dips into the bucket D when the latter is in its elevated position, as shown in the full lines in Fig. 1 of the drawings. A small cup is fixed on the bottom of the siphon-tube, said cup being lettered V, and a second siphon-tube W is arranged within the bucket D, the longer leg of this siphon passing through the bottom of the bucket and serving when brought into use to empty the contents of the bucket into the supplementary tank.

The water-line of the tank when the latter is full and just about to be discharged is indicated by the dotted line $xx$, and the operation of the apparatus is as follows: When the water flowing through the ball-cock has filled the tank A to the point indicated by the dotted line $xx$ and has therefore reached the top of the bend of the siphon U, it flows down through the longer leg of the siphon and fills the bucket D up to the point indicated by the dotted line $yy$. The weight of the water in the bucket causes the latter to descend, and, drawing down the end of lever F, pulls open the valve M, whereupon the water in the tank flows down the flushing-pipe L and flushes the receptacle to which said pipe is connected. When the water in the bucket has reached the dotted line $y\ y$, it begins to flow through the siphon W, and eventually the entire contents of the bucket are discharged and the parts will return to their first position. The water which flows through siphon W into the supplementary tank B is carried off through the waste-pipe C, and this pipe also serves to carry off any water that might flow from the tank A over the top of tank B if by accident the parts should fail to work in the proper manner.

The periods at which the automatic discharge of the tank shall take place can be regulated by regulating the flow of water through the ball-cock P in the usual manner, and I have suggested the use of a ball-cock, for the reason that the gradual shutting-off of water by the rise of the ball prolongs the time required to fill the tank and lengthens the time between the discharges of water into the flushing-pipe L.

Having described my invention, I claim—

1. In an automatic flushing apparatus, the combination with a main tank and a supplementary tank, of a flushing-pipe and valve a lever connected to said valve, a bucket suspended from said lever and within the supplementary tank, a siphon-pipe leading from the main tank to the supplementary tank and discharging into said bucket and means for automatically emptying said bucket after it has descended and opened the valve, substantially as described.

2. In a flushing apparatus, the combination of main and supplementary tanks, a bucket adapted to rise and fall and by its movement governing the flow of water from the main tank, with a siphon adapted to discharge water from the main tank into said bucket and a second siphon adapted to discharge the water from the bucket into the supplementary tank, substantially as described.

In testimony whereof I have affixed my signature in presence of two witnesses.

PETER F. GLACKIN.

Witnesses:
CHAS. F. ARROTT,
J. C. LANGFITT.